United States Patent
Moyle et al.

(10) Patent No.: US 9,697,058 B2
(45) Date of Patent: *Jul. 4, 2017

(54) METHOD, COMPUTER PROGRAM AND APPARATUS FOR CONTROLLING ACCESS TO A COMPUTER RESOURCE AND OBTAINING A BASELINE THEREFOR

(71) Applicant: ORACLE INTERNATIONAL CORPORATION, Redwood Shores, CA (US)

(72) Inventors: Stephen Anthony Moyle, Oxford (GB); Paul Anthony Galwas, St. Ives (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,982

(22) Filed: Jun. 27, 2013

(65) Prior Publication Data

US 2014/0013335 A1 Jan. 9, 2014

Related U.S. Application Data

(63) Continuation of application No. 12/187,113, filed on Aug. 6, 2008, now Pat. No. 8,479,285.

(Continued)

(51) Int. Cl.
*G06F 9/54* (2006.01)
*G06F 21/55* (2013.01)
*H04L 29/06* (2006.01)

(52) U.S. Cl.
CPC .............. *G06F 9/546* (2013.01); *G06F 21/55* (2013.01); *H04L 63/10* (2013.01); *H04L 63/14* (2013.01); *H04L 63/0823* (2013.01)

(58) Field of Classification Search
CPC ............ H04L 63/1408; H04L 63/1416; H04L 63/1433; H04L 63/1425
(Continued)

(56) References Cited

U.S. PATENT DOCUMENTS 6,199,034 B1 3/2001 Wical
6,311,278 B1 10/2001 Raanan et al.
(Continued)

FOREIGN PATENT DOCUMENTS

EP 1830253 9/2007
WO 0209339 1/2002
(Continued)

OTHER PUBLICATIONS

U.S. Appl. No. 11/672,253 Non-Final Office Action mailed on Aug. 5, 2010, 17 pages.
(Continued)

*Primary Examiner* — Tae Kim
(74) *Attorney, Agent, or Firm* — Kilpatrick Townsend & Stockton LLP

(57) ABSTRACT

A plurality of computer messages are classified into clusters according to the behavior of the computer messages in the context of a computer resource. For a new message of the plurality of computer messages, it is determined whether the cluster to which the new computer message is classified has been seen previously. A measure is then obtained of the probability that the cluster to which the next new message will be classified has been seen previously.

28 Claims, 6 Drawing Sheets

Related U.S. Application Data

(60) Provisional application No. 60/954,628, filed on Aug. 8, 2007.

(58) Field of Classification Search
USPC .................................................... 726/1–3
See application file for complete search history.

(56) References Cited

U.S. PATENT DOCUMENTS

| | | | |
|---|---|---|---|
| 6,327,561 | B1 | 12/2001 | Smith et al. |
| 6,470,306 | B1 | 10/2002 | Pringle et al. |
| 7,089,592 | B2* | 8/2006 | Adjaoute ........................ 726/25 |
| 7,228,561 | B2* | 6/2007 | Sameshima et al. ............. 726/2 |
| 7,243,086 | B2 | 7/2007 | Polak |
| 7,343,624 | B1* | 3/2008 | Rihn et al. ....................... 726/24 |
| 7,415,719 | B2* | 8/2008 | Moghe et al. .................... 726/1 |
| 7,454,779 | B2* | 11/2008 | Hughes et al. ................... 726/2 |
| 7,458,094 | B2* | 11/2008 | Jackson ............................ 726/2 |
| 7,487,149 | B2 | 2/2009 | Wong |
| 7,549,162 | B2* | 6/2009 | Aaron .............................. 726/12 |
| 7,657,927 | B2* | 2/2010 | Tajalli et al. ..................... 726/2 |
| 7,712,133 | B2* | 5/2010 | Raikar et al. .................... 726/23 |
| 7,912,701 | B1 | 3/2011 | Gray et al. |
| 7,983,900 | B2 | 7/2011 | Moyle |
| 8,028,160 | B1* | 9/2011 | Orr ................................. 713/151 |
| 8,122,508 | B2* | 2/2012 | Rihn et al. ....................... 726/24 |
| 8,132,250 | B2* | 3/2012 | Judge et al. ..................... 726/13 |
| 8,145,474 | B1 | 3/2012 | Daily et al. |
| 8,265,925 | B2 | 9/2012 | Aarskog |
| 8,311,806 | B2 | 11/2012 | Bonnet et al. |
| 8,468,244 | B2 | 6/2013 | Redlich et al. |
| 8,479,285 | B2 | 7/2013 | Moyle et al. |
| 8,666,731 | B2 | 3/2014 | Moyle et al. |
| 8,825,473 | B2 | 9/2014 | Moyle et al. |
| 2002/0037035 | A1 | 3/2002 | Singh |
| 2003/0149562 | A1 | 8/2003 | Walther |
| 2003/0195785 | A1 | 10/2003 | Thalangara et al. |
| 2004/0015719 | A1* | 1/2004 | Lee et al. ....................... 713/201 |
| 2004/0143791 | A1 | 7/2004 | Ito et al. |
| 2004/0153512 | A1 | 8/2004 | Friend |
| 2004/0236839 | A1 | 11/2004 | Wilson et al. |
| 2005/0057378 | A1 | 3/2005 | Savari |
| 2005/0132060 | A1 | 6/2005 | Mo et al. |
| 2005/0283519 | A1 | 12/2005 | Turgeman et al. |
| 2006/0070047 | A1 | 3/2006 | Narayanasamy et al. |
| 2006/0075099 | A1 | 4/2006 | Pearson et al. |
| 2006/0092861 | A1 | 5/2006 | Corday et al. |
| 2006/0150238 | A1* | 7/2006 | D'Agostino ..................... 726/1 |
| 2006/0265745 | A1* | 11/2006 | Shackleton et al. ............ 726/22 |
| 2007/0055662 | A1 | 3/2007 | Edelman et al. |
| 2007/0083856 | A1 | 4/2007 | Chilimbi et al. |
| 2007/0185703 | A1* | 8/2007 | Moyle ................................ 704/9 |
| 2007/0214504 | A1* | 9/2007 | Milani Comparetti et al. ............................... 726/23 |
| 2007/0256139 | A1* | 11/2007 | Gaos et al. ...................... 726/26 |
| 2008/0120720 | A1* | 5/2008 | Guo et al. ........................ 726/23 |
| 2008/0134336 | A1 | 6/2008 | Rihn et al. |
| 2008/0141332 | A1* | 6/2008 | Treinen ............................. 726/1 |
| 2008/0222734 | A1 | 9/2008 | Redlich et al. |
| 2008/0282352 | A1 | 11/2008 | Beddoe et al. |
| 2009/0044256 | A1 | 2/2009 | Moyle et al. |
| 2009/0055166 | A1 | 2/2009 | Moyle |
| 2009/0063869 | A1* | 3/2009 | Kohavi et al. ................. 713/189 |
| 2009/0192968 | A1 | 7/2009 | Tunstall-Pedoe |
| 2010/0071061 | A1* | 3/2010 | Crovella et al. ................ 726/23 |
| 2011/0131034 | A1 | 6/2011 | Moyle et al. |
| 2012/0109639 | A1 | 5/2012 | Moyle |
| 2012/0151590 | A1* | 6/2012 | Rihn et al. ....................... 726/24 |
| 2015/0100584 | A1 | 4/2015 | Moyle |

FOREIGN PATENT DOCUMENTS

| | | |
|---|---|---|
| WO | 03090046 | 10/2003 |
| WO | 2010084344 | 7/2010 |

OTHER PUBLICATIONS

U.S. Appl. No. 12/187,104 Final Office Action mailed on Jan. 4, 2011, 9 pages.
U.S. Appl. No. 12/187,104 Non-Final Office Action mailed on Aug. 6, 2010, 10 pages.
U.S. Appl. No. 12/187,104 Notice of Allowance Mar. 14, 2011, 7 pages.
U.S. Appl. No. 12/187,113 Advisory Action mailed on Jan. 12, 2012, 3 pages.
U.S. Appl. No. 12/187,113 Non-Final Office Action mailed on Apr. 28, 2011, 22 pages.
U.S. Appl. No. 12/187,113 Notice of Allowance mailed on May 9, 2013, 18 pages.
U.S. Appl. No. 12/187,113 Office Action mailed on Nov. 9, 2011, 12 pages.
U.S. Appl. No. 12/187,113 Office Action mailed on Apr. 5, 2012, 17 pages.
U.S. Appl. No. 12/187,113 Office Action mailed on Oct. 22, 2012, 6 pages.
U.S. Appl. No. 12/887,725 Advisory Action mailed on Mar. 7, 2013, 7 pages.
U.S. Appl. No. 12/887,725 Non Final Office Action mailed on Jun. 3, 2013, 17 pages.
U.S. Appl. No. 12/887,725 Notice of Allowance mailed on Oct. 11, 2013, 14 pages.
U.S. Appl. No. 12/887,725 Office Action mailed on Sep. 25, 2012, 12 pages.
U.S. Appl. No. 12/887,725 Office Action mailed on Dec. 28, 2012, 19 pages.
U.S. Appl. No. 13/160,365 Method, Computer Program and Apparatus for Analyzing Symbols in a Computer System, filed Jun. 14, 2011.
Aho et al., Compilers Principles, Techniques, and Tools, Addison-Wesley Publishing Company, XP002940830, BNS, Sep. 15, 1985, pp. 1-8 and 149-161.
European Application No. EP07250432.7 Article 94(3) EPC Communication mailed on Oct. 13, 2009.
European Application No. EP07250432.7 Article 94(3) EPC Communication mailed on Jun. 30, 2010, 7 pages.
European Application No. EP07250432.7 European Extended Search Report mailed on Feb. 18, 2009, 9 pages.
Manning et al., Compression and explanation using hierarchical grammars, Computer Science Department, University of Waikato, New Zealand, Retrieved from the Internet: http://citeseerx.ist.psu.edu/viewdoc/summary?doi=1 0.1.1.57.1150, 1997, 22 pages.
Moyle et al., Machine Learning to Detect Intrusion Strategies, Published in V Palade, 7th International Knowledge based Intelligent information and engineering system (KES 2003), LNAI 2663, 2003. Oxford, Springer-Verlag heidelberg, 2003, pp. 371-378.
Muggleton , Learning from positive data, Proceedings of the Sixth International Workshop on C4 Inductive Logic Programming (ILP-96), Lecture Notes in Artificial Intelliegence 1314. Berlin, 1996. Springe r-Verlag., 1996, pp. 358-376.
International Application No. PCT/GB2010/050074 International Search Report and Written Opinion mailed on May 18, 2010, 17 pages.
U.S. Appl. No. 13/145,292, Non-Final Office Action mailed on Jan. 16, 2014, 10 pages.
U.S. Appl. No. 13/145,292, Notice of Allowance mailed on Apr. 25, 2014, 8 pages.
Non-Final Office Action for U.S. Appl. No. 14/458,075 dated Dec. 15, 2015, 12 pages.
Non-Final Office Action dated Dec. 15, 2015, for U.S. Appl. No. 14/458,075, 12 pages.
U.S. Appl. No. 14/458,075, Non-Final Office Action mailed on Jun. 7, 2016, 9 pages.

* cited by examiner

METHOD, COMPUTER PROGRAM AND APPARATUS FOR CONTROLLING ACCESS TO A COMPUTER RESOURCE AND OBTAINING A BASELINE THEREFOR

CROSS-REFERENCE TO RELATED APPLICATIONS

This application claims priority to U.S. patent application Ser. No. 12/187,113, filed on Aug. 6, 2008, entitled METHOD, COMPUTER PROGRAM AND APPARATUS FOR CONTROLLING ACCESS TO A COMPUTER RESOURCE AND OBTAINING A BASELINE THEREFOR, which claims the benefit of priority to U.S. application Ser. No. 60/954,628, filed Aug. 8, 2007, the content of which is hereby incorporated by reference in its entirety for all purposes.

FIELD OF INVENTION

In one aspect, the invention relates to a method, a computer program and apparatus for controlling access to a computer resource. In another aspect, the invention relates to a method, a computer program and apparatus for obtaining a baseline therefor.

BACKGROUND OF THE INVENTION

Effective controls are an important part in the security of IT systems, which is being increasingly highlighted by the growing number of regulatory standards to which companies must adhere, e.g. The Sarbanes-Oxley Act (SOX), The Health Insurance Portability and Accountability Act (HIPPA), Payment Card Industry (PCI) Data Security Standard (DSS), etc. A major aspect of these controls is ensuring that people and programs can do only what is appropriate to their roles or functions.

A number of techniques are known for performing such control. For example, one or both of the following approaches may be used:
(i) authentication, e.g. by use of a log-in user name, possibly in conjunction with a log-in password, or other credential such as digital certificate or token. This plausibly identifies who is asking to perform some set of tasks before rights are granted to allow the tasks to be carried out;
(ii) encryption. This is typically used to restrict access to data to only those who have the decryption keys, which in turn is typically controlled by authentication.

These approaches usually offer poor control over the behavior of the user or program, since once authenticated, the system typically grants rights to perform a wide range of functions.

Application-level authorization is sometimes also used, where an application specifically grants rights to sets of application-specific functionality. Typically, however, such specific rights have to be set manually for each user and for each of the sets of application-specific functionality (e.g. user A can read from folder Z:\Windows, but not write to it; or user B can read from and write to a file in a shared office electronic calendar when on the office LAN, but can functionality (e.g. user A can read from folder Z:\Windows, but not write to it; or user B can read from and write to a file in a shared office electronic calendar when on the office LAN, but can only read from it when connecting over an untrusted network, whereas user C can read from and write to a file in a shared office electronic calendar whether connecting over the office LAN or over an untrusted network). Because these rights have to be set manually, the process is laborious and prone to error and, as a result, has not been cost-effectively generalized to control arbitrary computer programs or services, access to sophisticated data stores, or use of communication protocols, which may also support very large, and potentially infinite, numbers of different functions. Often too much access to resource functionality is provided for fear of accidentally restricting a legitimate business function which results in an over-provisioning of access to functionality above the absolute least required.

The current compliance requirements and threat landscape are such that IT controls need to exert much tighter discrimination over what an authenticated person or program may do, specifically defining what is acceptable behavior and what is not, and then enforce those rules in a way that removes the need for manual setting of all rights to application-specific functionality.

Patent application U.S. Ser. No. 11/672,253 and EP07250432.7

In our patent application U.S. Ser. No. 11/672,253 and EP07250432.7 entitled "METHOD, COMPUTER PROGRAM AND APPARATUS FOR ANALYZING SYMBOLS IN A COMPUTER SYSTEM", the entire contents of which are hereby incorporated by reference, there is disclosed a process that allows the classification of a set of computer statements against a grammar. In particular, this allows construction of a set of classifications that represent the normal or allowed behavior of a computer system, referred to herein as a "baseline". The process can efficiently and exactly determine whether a new statement is within that baseline or is new, which, being new, therefore represents potentially dangerous behavior. A security control can be built on these properties, for example to allow statements that are within the baseline and to block or warn on those that are outside of it.

In our copending US and EP patent applications, there is disclosed a computer-implemented method of analyzing symbols in a computer system, the symbols conforming to a specification for the symbols, the method comprising: codifying the specification into a set of computer-readable rules; and, analyzing the symbols using the computer-readable rules to obtains patterns of the symbols by: determining the path that is taken by the symbols through the rules that successfully terminates, and grouping the symbols according to said paths.

As will be appreciated, the term "symbols" in this context is to be construed broadly. In general, the term "symbols" is used herein in the broad sense as used in the field of Universal Turing Machines. For example, "symbols" includes computer messages, which term is also to be construed broadly and includes for example computer messages in a computer language (including computer instructions, such as executable programs), natural languages in computer-readable form (such as in documents, emails, etc.). "Symbols" also includes computer data in the conventional sense, i.e., typically, abstractions of real world artifacts, etc.

By analyzing the symbols into patterns, new symbols can be analyzed more efficiently than in prior art techniques, which makes it possible to implement the method in real-time with relatively little computational overhead.

In an embodiment disclosed in our copending US and EP patent applications, the method is carried out on new symbols to determine whether the new symbols fit a pattern of data that is known or constitute a new pattern. In practice, if the new symbols fit a pattern that is known, then a decision will already have been made as to whether symbols fitting that known pattern are to be deemed acceptable or not. If the symbols constitute a new pattern, in practice a decision will have been made what to do with symbols that constitute a new pattern, such as "always deem not acceptable" or "send error report", etc.

In an embodiment disclosed in our copending US and EP patent applications, the method is initially carried out on training examples of symbols. This allows a base set of patterns of symbols to be built up. These can be analyzed by a human domain expert who can determine which patterns relate to acceptable or normal behavior, so that new symbols can be classified accordingly. In principle, the training examples may be examples of symbols that are known to be acceptable thereby to obtain patterns of symbols that are known to be acceptable. However, more likely in practice is that the training examples will be general and a decision will be made later, after the patterns have been produced and based on the patterns, as to which patterns are to be deemed acceptable or not.

In an embodiment disclosed in our copending US and EP patent applications, it is determined to be sufficient to take only a single said path that successfully terminates. As will be explained further below, this improves the efficiency of the method.

In a preferred embodiment disclosed in our copending US and EP patent applications, the specification is codified by defining a first order logic that describes the specification; and, the symbols are analyzed using the first order logic to obtain patterns of the symbols by: determining the symbols that is taken by each symbol through the first order logic that successfully terminates, and grouping the symbols according to said paths.

The use of first order logic provides for a particularly efficient method and one that is comparatively easy to implement.

In a preferred embodiment disclosed in our copending US and EP patent applications, the first order logic has clauses at least some of which are parameterized. In other words, some of the clauses have labels applied thereto, the labels relating to the probability of the clause being "true" in the context of the system in which the symbols are passing.

Preferably, as disclosed in our copending US and EP patent applications, at least some of the clauses have a head that is parameterized, the determining step in the analyzing step being carried out by determining a path of clauses having a parameterized head through the first order logic that is taken by each symbol that successfully terminates. As will be explained further below, this improves the efficiency of the method.

In a most preferred embodiment disclosed in our copending US and EP patent applications, the first order logic is a stochastic logic program having at least some clauses that are instrumented, the determining step in the analyzing step being carried out by determining a path of said instrumented clauses through the first order logic that is taken by each symbol that successfully terminates.

In another embodiment disclosed in our copending US and EP patent applications, the specification is codified into a Java program; and, the symbols are analyzed using the Java program to obtain patterns of the symbols by: determining the execution path that is taken by each symbol through the Java program that successfully terminates, and grouping the symbols according to said execution paths.

In an embodiment disclosed in our copending US and EP patent applications, the symbols are messages of a computer language, said specification being the computer language, and wherein the codifying the specification into a set of computer-readable rules comprises defining computer-readable rules that describe the grammar of the computer language.

In another embodiment disclosed in our copending US and EP patent applications, the symbols are data.

In an embodiment disclosed in our copending US and EP patent applications, the method comprises generalizing the symbols by generalizing to the paths. This allows generalization to be tractable.

In more detail, the following is disclosed in our copending US and EP patent applications. In the immediately following description, reference will be made principally to computer messages written in a computer language, and to the use of first order logic including stochastic logic programs in particular. However, as will be appreciated from the foregoing and as explained further below, the symbols that are analyzed can in general be of any type that conforms to a specification and that techniques other than first order logic may be applied.

In a computer system, messages are used to specify the desired operational behavior of components in the computer system. Thus, messages are used between components within the computer system, and messages are used by users to gain access to the computer system. High level or "scripting" languages are used to facilitate the use of messages in a computer system. The computer language is defined by a grammar so that messages conform to a known syntax. The grammar of such languages is published so that software developers can ensure that the messages of the software conform to the correct syntax. By way of example only, the syntax for the SQL language is published as an ISO standard.

The preferred embodiments disclosed in our copending US and EP patent applications operate by analyzing new messages to determine whether they fit a pattern of messages that is deemed to be acceptable. In this context, a message is "new" if it has not been seen by the system previously.

The preferred embodiments disclosed in our copending US and EP patent applications are not concerned with generating new rules for new messages, and instead, as stated, are concerned with determining patterns for computer messages. The patterns that are obtained can then be considered, for example "manually" by a human user, to determine whether a computer system has been compromised. Alternatively, the patterns can be automatically analyzed by a computer-implemented method, so that messages can be accepted or rejected, preferably effectively in real time and therefore "on the fly".

In the preferred embodiment disclosed in our copending US and EP patent applications, the grammar of the computer language of the messages that are to be analysed analyzed is defined using first order logic. This may be carried out in a manner that is known per se. For example, the programming language Prolog can be used to describe the grammar of the language as a set of first order logic. This logic is then applied initially to a set of training examples of messages. Such messages are defined so as to be correct syntactically in the context of the language and appropriate in the sense that they are messages that are deemed to be acceptable in the context of usage of the system around which the messages pass. The logic contains clauses. When the logic is applied to the messages, the identity of the clauses along a successful path is noted. In this way, paths of acceptable messages through the logic are obtained. These paths can then be grouped according to similarity. In turn, the messages that follow the respective paths can be grouped according to similarity in this sense, so that patterns of similar messages can be discerned. This means that new messages, which are different from messages used in the training, can then be allocated to patterns of messages that are known to be acceptable, or rejected.

In the preferred embodiment disclosed in our copending US and EP patent applications, some of the clauses of the program logic are annotated with probabilities of the clauses being true in the context of the messages in the computer system. By appropriate labeling of these annotated clauses, a very efficient system for analyzing the messages into patterns can be obtained. The preferred embodiment disclosed in our copending US and EP patent applications uses logic in the form of a stochastic logic program.

In general, for an arbitrary stochastic logic program, it is non-trivial to calculate the correct labels to be applied to the clauses based on the program and a set of training examples. For example, a naive way to build up the labels on the clauses in the stochastic logic program is to count every time that each clause "fires" (i.e. the clause is determined to be "true") when applying the training examples. There are however two immediate problems with this simple approach. First, it may be that there are several "successful" paths through the logic when applying the logic to a particular example, which can cause multiple counting of the same clauses and/or undercounting of the same clauses. Secondly, clauses will still fire and therefore be counted even when the final derivation of the goal along a path of clauses fails. Whilst techniques are available for minimizing these problems, this naive method is still nevertheless computationally intensive and therefore cannot successfully be used in practice.

Before discussing a specific example of an embodiment disclosed in our copending US and EP patent applications in more detail, a more formal discussion of some aspects will now be given.

A logic program P is a conjunction of universally quantified clauses $C_1, \ldots, C_n$. Each clause is a disjunction of literals $L_k$. A goal G is a disjunction of negative literals ← $G_1, \ldots, G_m$. A definite clause is a clause with at most one positive literal (which is known as the head). A definite logic program contains only definite clauses. All clauses in a logic program with heads having the same predicate name and arity make up the definition of the clause.

A stochastic logic program (SLP) is a definite logic program where some of the clauses are parameterized with non-negative numbers. In other words, an SLP is a logic program that has been annotated with parameters (or labels). A pure SLP is an SLP where all clauses have parameters, as opposed to an impure SLP where not all clauses have parameters. A normalized SLP is one where parameters for clauses that share the same head predicate symbol and arity sum to one. If this is not the case, then it is an unnormalized SLP.

As will be understood from the following more detailed description, the preferred embodiments can be regarded as a parser that is a non normalized stochastic logic program, i.e. only a subset of the definitions or "clauses" have parameters, and the parameters for any definition do not sum to one.

As has been mentioned, typical approaches to fitting an SLP to a group of examples call each example in the presence of the SLP. Each time a parameterized clause is called, its firing count is incremented. Once all of the examples have been processed, the firing counts for a definition are then summed and the labels that are given to the clauses are normalized versions of the firing counts. However, again as mentioned, the runtime overhead of keeping track of the parameterized definitions is significant, particularly given the problem of what to do when the firing clauses do not lead to a successful derivation for the example. This is overcome in the preferred embodiment by making the assumption that only single success paths are important in accepting a particular message. This means that only the first successful derivation path through the SLP needs to be recorded. It is not necessary to take into account any other or all other successful derivation paths when calculating the parameters to be applied to the clauses of the SLP. This assumption of using single success paths through the SLP contributes to making the method more efficient. Taking only a single (the first) success path is sufficient in the present context because the principal purpose is to cluster the messages with respect to the grammar.

Another contributor to the efficiency of the preferred embodiment is the use of so-called instrumentation. In particular, the heads of certain clauses are parameterized, which is referred to herein as "instrumented". This can be performed at compile time. In an example, each clause that is part of a definition to be labeled is expanded at compile time, and an additional instrumentation literal slp_cc/1 is placed immediately after the head of the clause.

For example the clause p(X):-r(X). will be compiled to p(X):-slp_cc(5), r(X). say (where it is the fifth clause to be instrumented by the compiler).

A relevant compiler code snippet is shown below:

```
slp_clause(File, '$source_location'(File, Line):Clause) :-
    slp_clause(File, Line, Label, Clause0),
    expand_term(Clause0, Clause1),
    gen_cid(File, N),
    assert_label(Label, N, File),
    (       Clause1 = (Head :- Body0)
    ->      Clause = (Head :- slp_cc(N), Body),
            slp_body(Body0, Body, File)
    ;       Clause = (Clause1 :- slp_cc(N)),
            Clause1       = Head
    ),
    general_term(Head, Def),
    assert(cid_def(N, File, Def)).
```

Data structures for keeping track of compiled clauses, their modules, and the context in which they are being utilized are initialized by the compiler.

The main objective of the system is to collect the sequence of all instrumented predicates that were used in the successful derivation of a goal G. Any non-deterministic predicates that were tried and failed in the process are ignored: only the first successful derivation is used in accordance with the assumption discussed above (though backtracking is not prohibited by the methods described herein).

The preferred runtime system makes use of extensions to the standard Prolog system called global variables. These are efficient associations between names (or "atoms") and terms. The value lives on the Prolog (global) stack, which implies that lookup time is independent of the size of the term. The global variables support both global assignment (using nb_setval/2) and backtrackable assignment using (b_setval/2). It is the backtrackable assignment of global variables that are most useful for the preferred runtime system disclosed in our copending US and EP patent applications.

The runtime system with the instrumentation works as follows. When a goal G is called using slp_call/1, a global variable slp_path is created to store the sequence of successful instrumented predicates. When an instrumentation literal slp_cc/1 is called, the path so far is retrieved from the global variable slp_path to which the clause identifier is added before the slp_path is updated. All of these assignments are backtrackable should any subsequent sub-goal fail.

An example of the kernel of the runtime system is shown below:

```
/********************************
 *         CALLING         *
 ********************************/
%       slp_call(:Goal, -Path)
slp_call(Goal, Path) :-
        b_setval(slp_path, [ ]),
        Goal,
        B_getval(slp_path, Path).
/********************************
 *      INSTRUMENTATION    *
 ********************************/
slp_cc(Clause) :-
        b_getval(slp_path, P0),
        b_setval(slp_path, [Clause|P0]).
Slp_id(SetID, IdentifierValue) :-
        b_getval(slp_path, P0),
        b_setval(slp_path, [id(SetID, IdentifierValue)|P0]).
        (The slp_identifier/2 literal will be discussed below.)
```

For example, consider a parser in accordance with a preferred embodiment disclosed in our copending US and EP patent applications that is written to accept SQL statements as a Prolog module sql. The SQL grammar as published has several hundred clausal definitions. In one example of the preferred method, the following eleven clausal definitions of the SQL grammar are defined (by a human operator) as being worthy of instrumenting:

```
:- slp
        select_list//0,
        derived_column//0,
        join//0,
        expression//0,
        query_specification//0,
        derived_column//0,
        set_quantifier//0,
        column_name_list//0,
        expression_list//0,
        show_info//0,
        cmp//0.
```

The SLP can be used to determine the path of the derivation of the parse of a message in the following manner:

```
?- slp_call(parse(
        "select * from anonData where anonID =
        'nX19LR9P'" ), Path).
Path = [21, 26, 17, 20,19, 13, 12, 4]
```

The numbers returned in the path sequence are the identifiers of the clauses for the instrumented predicate (given in reverse order). In other words, by applying the SLP parser to the message, the identity of the clauses along the successful path through the SLP parser can be obtained (and are written to the variable "Path"). This allows the path to be clustered with other similar paths. During training time, when the messages to which the system is applied are training examples, this "clusters" the messages into groups or sets of syntactically similar messages, irrespective of the semantics or content of the messages. (It will be understood that the patterns or clusters of any particular example will depend on the precise training examples that are given to the system during the training period and the instrumentation given to the program during compile time.) During runtime, messages are similarly analyzed and effectively allocated to the patterns obtained during the training stage at training time. Significantly in the present context, even new messages, which literally have not been seen by the system previously, are allocated to the patterns obtained during the training stage. Thus, this provides the important feature of analyzing messages in the computer system into patterns, even if the messages are new.

In a practical example, the overhead of the instrumentation on the runtime system has been found to be low compared with prior art approaches.

One weakness of associating normalized firing counts with probability distributions is that of "contextualizaton". A good "fit" of probabilities would be when the observed path frequencies match that of the so-called Markov chain probabilities of the path, where this is calculated by the product of the observed individual clause labels in a path. For example, consider a parser with a "terminal" that is an integer, that is being used in accepting log items from syslog that records DHCPD messages. (A terminal symbol is a symbol that actually occurs in the language concerned.) The integer terminal could appear in any of the date, time, and IP address portions of the messages, all of which in general end in an integer. It has been found that the fit between firing counts and calculated Markov chain distribution is poor in such circumstances where instrumented terminals belong to different contexts. It has also been found that the Markov chain probabilities fit the observed path probabilities in situations where there are no such context ambiguities. The context of the particular terminal is "lost".

To at least partially remedy these effects, the preferred embodiment disclosed in our copending US and EP patent applications uses set identifiers. These are terms that are defined to belong to a particular set.

For example, consider a portion of an SQL parser (written as a Definite Clause Grammar or DCG) where it is determined that elements of the sets "table" and "column" are of interest. The slp_identifier/2 literal specifies the set name (either "table" or "column" in this case), and the value to associate with the set.

```
table_name -->
        [ delimited(TName), period, delimited(CName) ],
        { concat_atom([TName, '.', CName], Name),
         slp_identifier(table, Name) }
        !.
table_name -->
        [ identifier(Name) ],
        { slp_identifier(table , Name) }.
column_name -->
        [ identifier(Name) ],
        { slp_identifier(column, Name) }.
```

In the same manner as clause paths are generated using firing clauses as described above, such paths are augmented with their set name-value pair when set identifiers are used. The runtime system for this again uses backtrackable global variables to keep track of the set name-value pairs for successful derivations. (The use of a slp_identifier/2 literal is shown in the example of the kernel of the runtime system given above.)

If the previous SQL example is run again but with the slp_identifiers above installed, the following is obtained:

```
?- slp_call(
    parse(
        "select * from anonData where anonID = 'nX19LR9P'"
    ), Path).
Path =
    [21, 26, id(3, anonID), 17, 20, 19, id(2, anonData),   13, 12, 4]
```

The element id(3, anonID) says set number 3 (corresponding to items of type "column") contains the value anonID.

It will be understood that the clause paths that are obtained represent a form of generalization from the training examples. From a textual parsing perspective, this provides a mapping from a string of ASCII characters to tokens and, with respect to a background-instrumented parser, a mapping to clause paths. In the preferred embodiment, the clause paths may include SLP identifier set name-value pairs as discussed above. Each clause identifier maps to a predicate name/arity. In this sense, a predicate is a family of clauses. A clause path can be mapped to a variable "predicate path".

Given that the raw messages are reduced to sequences in the preferred embodiment disclosed in our copending US and EP patent applications, it is then possible to perform traditional generalization techniques more efficiently because it is possible to generalize to the paths rather than to the whole Prolog program that describes the computer language. For example, the known "least general generalizations" method according to Plotkin can be used. Given that in the preferred embodiment disclosed in our copending US and EP patent applications the messages are represented as simple "atoms", the least general generalizations can be carried out in a time that is proportional to the length of the sequence. In general, the maximum time required to carry out this known least general generalization is proportional to the maximum sequence length and the number of examples.

In summary, the preferred embodiments disclosed in our copending US and EP patent applications allow messages to be analyzed to cluster the messages into patterns. A human domain expert can then inspect the clusters to decide which are to be regarded as "normal" and therefore acceptable, and which are to be regarded as "abnormal" and therefore not acceptable.

To simplify this analysis by humans, and given that the cluster paths are not particularly understandable to humans, the clusters can be portrayed with a single exemplar, and the user given the ability to drill down into the examples that belong to the cluster. This has been shown to communicate the cluster and its properties effectively to human users. The paths behind the clusters can also be shown to users. In another example, the paths behind the clusters can be shown graphically by way of a parse map.

It is possible to extend the mappings described above, particularly the use of set identifiers for contextualization. For example, generalizations of interesting or key predicates can be defined. To illustrate this, the example given below considers how query specifications interact with particular tables:

```
:-    classify
query_specification//0,
id(table).
```

This can show for example different access methods to a table by their clusters.

In summary, given the language or similar definition of the specification for the data, the preferred embodiments disclosed in our copending US and EP patent applications initially use training examples to cluster computer messages or other data into groups of the same or similar type. New messages can then be clustered to determine whether they fit one of the patterns. A human expert will decide which of the patterns are regarded as normal and which are abnormal. In an intrusion detection or prevention system, this can then be used to accept or reject new messages accordingly. In another example, the message analysis can be used to build models of normal usage behavior in a computer system. This can be used to audit past behavior, as well as to provide active filters to only allow messages into and out of the system that conform to the defined model of normality. The techniques can be applied to obtain patterns from any type of data that conforms to a known specification. This includes for example data such as financial data, including data relating to financial transaction, which allows models of usage patterns to be obtained; so-called bioinformatics (e.g. for clustering sub-sequences of DNA); natural language messages, which can be used in many applications, e.g. the techniques can be used to form a "spam" filter for filtering unwanted emails, or for language education; design patterns for computer programs, engineering drawings, etc.

The use of stochastic logic programs that are instrumented as described herein for the preferred embodiments disclosed in our copending US and EP patent applications leads to very efficient operation, making real time operation of the system possible with only minimum overhead. However, as mentioned, other techniques are available.

Thus the methods disclosed in our copending US and EP patent applications allow the classification of a set of computer statements against a grammar. In particular, this allows a construction of a set of classifications that represent the normal or allowed behavior of a computer system, termed herein a baseline. The process can efficiently and exactly determine whether a new statement is within that baseline or is new and therefore represents new potentially dangerous behavior. A security control can be built on these properties, for example to allow statements that are within the baseline and to block or warn on those that are outside of it.

SUMMARY OF EMBODIMENTS OF THE INVENTION

According to a first aspect of embodiments of the invention, there is provided a computer-implemented method of obtaining a baseline for use in a computer-implemented method of controlling access to a computer resource in which computer messages are sent to the computer resource in which the computer messages are compared with the baseline to determine whether or not each of the computer messages represents acceptable behavior in the context of the computer resource, the baseline containing a set of computer messages which have been classified according to whether or not each of the computer messages of the set represents acceptable behavior in the context of the computer resource, the method comprising:

classifying a plurality of computer messages into clusters according to the behavior of the computer messages in the context of the computer resource;

determining, for a new message of the plurality of computer messages, whether the cluster to which the new computer message is classified has been seen previously; and, obtaining a measure of the probability that the cluster to which the next new message will be classified has been seen previously.

The efficiency of building and maintaining a baseline is a primary consideration for a system that uses this approach, particularly when it is necessary to protect many systems, databases or applications, each with different usage characteristics. This aspect significantly improves this efficiency compared with the prior art by allowing an operator to determine when the baseline is sufficiently complete, ie. whether a sufficient number of messages have been seen and classified. This therefore reduces the cost of using controls based on this approach and allows the controls to scale cost-effectively to significantly wider deployment.

According to a second aspect of embodiments of the invention, there is provided a computer program for obtaining a baseline for use in a computer-implemented method of controlling access to a computer resource in which computer messages are sent to the computer resource in which the computer messages are compared with the baseline to determine whether or not each of the computer messages represents acceptable behavior in the context of the computer resource, the baseline containing a set of computer messages which have been classified according to whether or not each of the computer messages of the set represents acceptable behavior in the context of the computer resource, the computer program comprising program instructions for causing a computer to carry out a method of:

classifying a plurality of computer messages into clusters according to the behavior of the computer messages in the context of the computer resource;

determining, for a new message of the plurality of computer messages, whether the cluster to which the new computer message is classified has been seen previously; and, obtaining a measure of the probability that the cluster to which the next new message will be classified has been seen previously.

According to a third aspect of embodiments of the invention, there is provided a computer-implemented method of controlling access to a computer resource in which computer messages are sent to the computer resource, the method comprising: comparing computer messages that are sent to a computer resource with a baseline to determine whether or not each of the computer messages represents acceptable behavior in the context of the computer resource, the baseline containing a set of computer messages which have been classified into clusters according to whether or not each of the computer messages of the set represents acceptable behavior in the context of the computer resource; determining on the basis of the received messages a measure of the likelihood that the next message to be received is a new message that has not been seen previously; and, comparing said likelihood with the actual occurrence of receipt of a new message.

This aspect provides a measure of the likelihood of seeing new messages. This can then be compared with what actually happens in practice, for example when new messages are actually received as determined by a monitoring process of the system. Any significant variation between what is expected and what occurs can be used as an additional indication that new messages are unexpectedly being received, which may indicate for example that the computer resource is under attack and that, in any event, investigation may be required.

According to a fourth aspect of embodiments of the invention, there is provided a computer program for controlling access to a computer resource in which computer messages are sent to the computer resource, the computer program comprising program instructions for causing a computer to carry out a method of:

comparing computer messages that are sent to a computer resource with a baseline to determine whether or not each of the computer messages represents acceptable behavior in the context of the computer resource, the baseline containing a set of computer messages which have been classified into clusters according to whether or not each of the computer messages of the set represents acceptable behavior in the context of the computer resource;

determining on the basis of the received messages a measure of the likelihood that the next message to be received is a new message that has not been seen previously; and, comparing said likelihood with the actual occurrence of receipt of a new message.

BRIEF DESCRIPTION OF THE DRAWINGS

Embodiments of the invention will now be described by way of example with reference to the accompanying drawings, in which.

Figure 1:
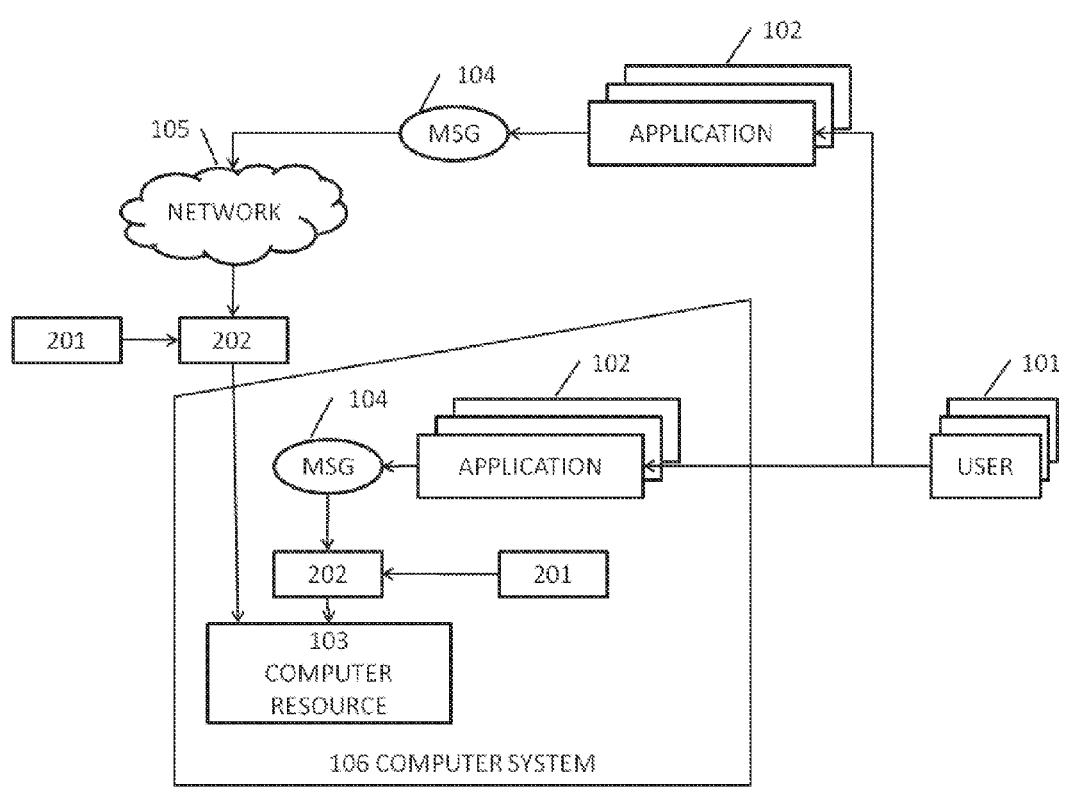
FIG. 1 shows schematically users accessing computer resources in a computer system.

Referring first to FIG. 1, in general a plurality of users 101 and applications 102 use a computer resource 103 by issuing messages 104 either over a network 105 or directly between sub-systems on a computer system 106. The computer resources 103 may in general be of any type, including for example a database, file system, computer service in a Service Oriented Architecture, or communication protocol. A monitoring process 202 has a baseline 201 which contains a set of messages that have been classified against a grammar for the messages, and each message-classification (or "cluster") has a set of actions to perform associated with that particular type of message.

The baseline 201 containing the clusters of classified messages is preferably obtained in a training process using the method discussed in detail in our patent application U.S. Ser. No. 11/672,253 and EP07250432.7 and above. The method can be regarded as a parser for the grammar which is represented as a definite logic program P that is a conjunction of universally quantified definite clauses $C_1, \ldots, C_n$, where each clause is a disjunction of literals $L_k$ that have at most one positive literal. A goal G is a disjunction of negative literals $\leftarrow G_1, \ldots, G_m$. A definite logic program contains only definite clauses. All clauses in a logic program with heads having the same predicate name and arity make up the definition of the clause. Some of the clauses are identified (called "instrumented" here) by a unique number.

The system classifies each message by collecting the sequence of all instrumented predicates that were used in the successful derivation of a goal G. Any non-deterministic predicates that were tried and failed in the process are ignored: only the first successful derivation is used.

The ordered set of instrumented values (called a cluster) is associated with one or more actions. Actions include for example: sending a message that a particular message 104 has been received, blocking a message, replacing a message with another, creating an audit log of the message, and triggering another program or service.

The monitoring process 202 receives a copy of those messages 104 and compares each with the baseline 201 which comprises a set of clusters, each with associated actions, as discussed above. When the monitoring process 202 matches the message with a cluster in the baseline, the process 202 performs the associated actions. If it does not match the message with a cluster in the baseline 201, the process 202 performs another previously specified set of actions.

The monitoring process 202 can be used to implement a range of security controls, including intrusion detection, intrusion prevention, and selective logging.

The effectiveness of the monitoring process depends in large part on the baseline 201 containing a sufficient number of clusters to represent all, or almost all, normal or acceptable messages 104 to the computer resource 103. For example, in well regulated and/or secured IT environments, it is appropriate for the set of normal messages to be limited to those that are required to perform a business function, since insecurities often arise through unacceptable uses of unnecessary functions. Even if a system is initially designed and commissioned to use only a well constrained set of messages, over time there tends to be an increase in functionality which is difficult to control, exposing the system to increased security risk.

The preferred training process described herein to obtain the baseline 201 provides an effective way of measuring when the sample from which a baseline 201 is built is sufficiently complete.

Figure 2A:
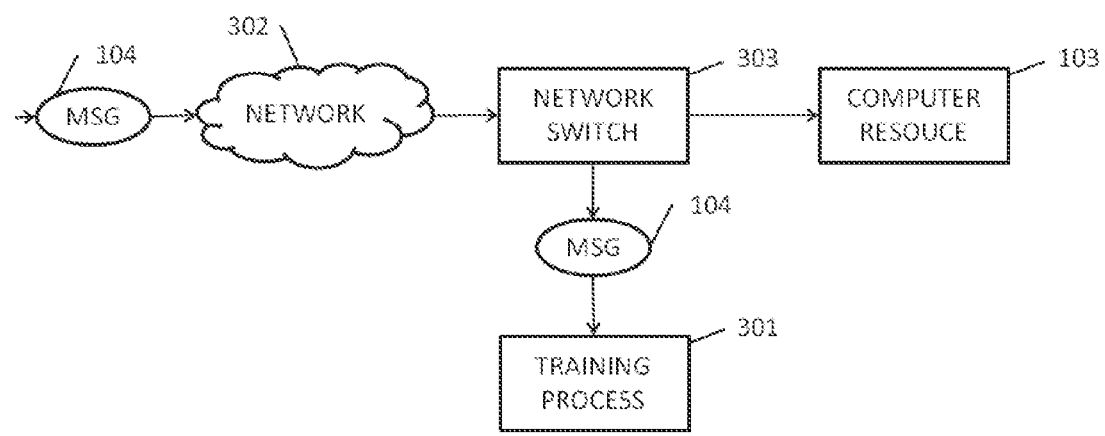
FIGS. 2A to 2C show how computer messages may be passed to a training process.
Figure 2B:
Figure 2C:
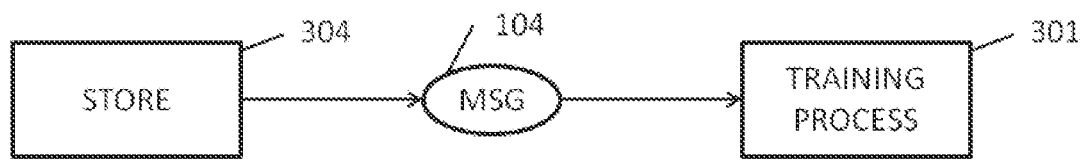

Referring to FIGS. 2A to 2C, the training process 301 can monitor messages 104 in a number of ways. For example, as shown in FIG. 2A, the training process 301 may receive a copy of traffic (i.e. computer messages 104) flowing across a network 302. The copies may be extracted by a network switch 303. Alternatively, as shown in FIG. 2B, the training process 301 may directly intercept the network traffic. As another alternative, as shown in FIG. 2C, the training process 301 may extract some or all data from a store 304 of for example, network traffic, log data, etc. The data in this context may be for example a subset of an ordered set of messages which may have been recorded and stored or may have been created or collected in other ways.

Figure 3:
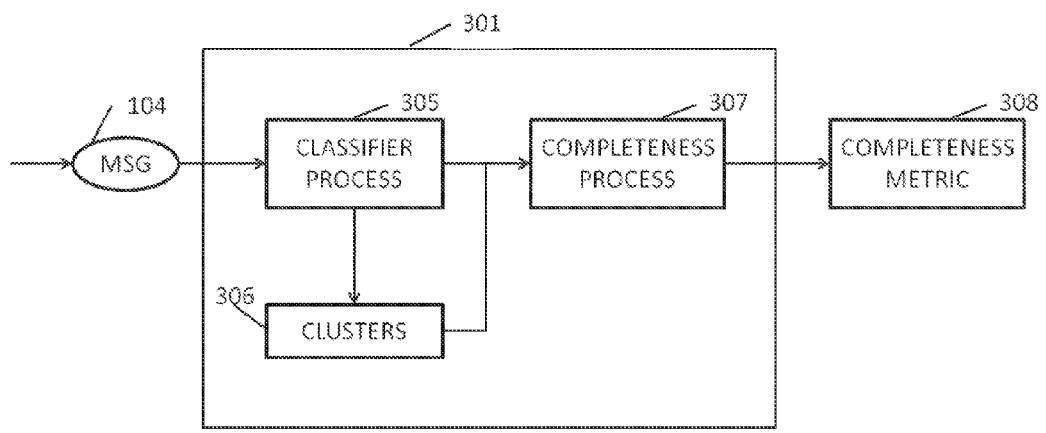
FIG. 3 shows schematically an example of a training process in accordance with an embodiment of the invention; and, FIG. 4 shows schematically an example of a monitoring process in accordance with an embodiment of the invention.

Referring now to FIG. 3, the training process 301 contains a classifier process 305 that identifies and stores messages 104 into clusters 306. This is preferably carried out using the approach described above and in more detail in our patent application U.S. Ser. No. 11/672,253 and EP07250432.7. A completeness process 307 computes and outputs a completeness metric 308 which assesses the likelihood of seeing a new message 104. The preferred completeness process 307 uses a combination of cluster algorithms and stochastic algorithms. The combination of the completeness process 307 and the clustering method carried out by the classifier process 305 provides a continuous, quantitative measure of whether recent traffic is new, which enables an operator to decide when the sample of clusters is sufficiently representative of behavior to enable construction of a baseline 201.

As mentioned, in essence, the completeness metric 308 provided by the completeness process 307 provides a probability that the next message 104 is new or old. A number of ways of achieving this are possible. One particularly preferred technique, which in general uses an n-dimensional Markov chain process, is discussed in detail below.

The preferred completeness process 307 consists of these steps, which are performed each time a new message 104 is received:

(i) classify the new message 104 against a cluster, which is identified by a unique ID;
(ii) add at the end of a list that represents the sequence of each cluster ID in the order they were seen either: (a) the cluster ID and whether it is new or has already been seen or (b) the cluster ID and timestamp and whether it is new or has already been seen;
(iii) represent new and old cluster activations as a 2-state Markov chain process;
(iv) compute the 1st order Markov matrix:

$$|PooPon|$$

$$|PnoPnn|$$

where Poo is the measured probability that the next cluster has already been seen (i.e. that it is "old") given that the last cluster is old; Pnn is the measured probability that the next cluster is previously unseen (i.e. that it is "new") given that the last cluster is new; Pon is the measured probability that the next cluster is new given the last cluster is old; and Pno is the measured probability that the next cluster is old given the last cluster is new; and,
(v) output the completeness metric 308 as the probability of seeing an old cluster next (Poo).

In this context, a 1st order Markov matrix is used to provide a probability that the next message 104 to be received, as represented by the cluster to which it is classified, is old given that the last cluster was old or new. This process can be generalized to n-dimensional matrices where an element predicts that the next cluster is old or new given that the last n clusters were some permutation of old and new.

The classifying of the new message against a cluster in step (i) above is preferably carried out using the method discussed in detail in our patent application U.S. Ser. No. 11/672,253 and EP07250432.7 and above.

The 1st order Markov matrix may be calculated in step (iv) above as follows. The completeness process 307 maintains a list of logical constants which indicate for each message received whether it has been seen before or not. Each time a new message arrives, the completeness process 307:

(i) adds to the end of this list the logical constant which indicates whether the message has a cluster ID that has been seen before (i.e. is old) or not;
(ii) computes a matrix, by a cross-tabulation of the list, comparing the 1st to last-1 elements with the 2nd to last elements, where the elements are:
    Too—the number of times already allocated IDs were used in succession,
    Ton—the number of times a newly allocated ID is followed by one that is already allocated,
    Tno—the number of times an already allocated ID is followed by one that is already allocated,
    Tnn—the number of times a new ID is followed by a new one; and,
(iii) computes the 1st order Markov matrix as follows:

$$\text{sum}=T(1,1)+T(1,2)+T(2,1)+T(2,2)$$

$$Poo=Too/\text{sum}$$

$$Pon=Ton/\text{sum}$$

$$Pno=Tno/\text{sum}$$

$$Pnn=Tnn/\text{sum}$$

As noted above, this can be generalized to n-dimensional Markov matrices.

The techniques described above therefore allow an operator to determine with confidence that the training process 301 has been carried out on a sufficient number of messages 104 to provide a baseline 201 that is sufficiently complete to be used in practice in a monitoring process 20 like that discussed above with reference to FIG. 1.

Figure 4:
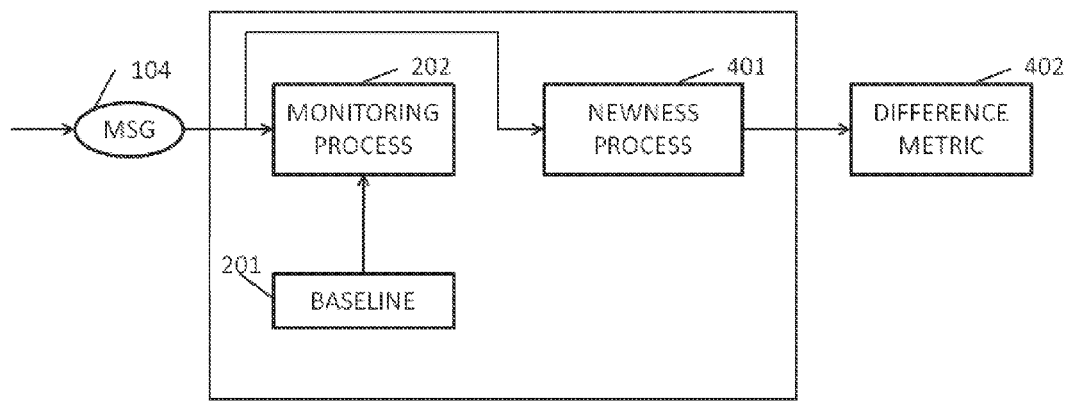

Referring now to FIG. 4, in a preferred implementation, while the monitoring process 202 is performing its security control function as defined by the baseline 201, a parallel process, termed herein the newness process 401, computes and outputs a difference metric 402, which is a measure of the likelihood of seeing new messages or traffic. New traffic might result for one or more of three major reasons: a new version of a computer program has been released that supports wider functions, and these are being used; the usage pattern of a program has changed, perhaps because people are using a wider range of functionality or sending different messages 104 to it; and the computer resource 103 is under attack, which results in atypical and undesirable messages 104.

In one preferred embodiment, the newness process 401 computes the matrix N=log(P), and maintains a list of logical constants which indicate for each message received whether it has been seen before or not. Each time a new message arrives, the newness process 401 performs the following steps:
(i) classify the new message against a cluster, identified by a unique ID, and whether it is new or not;
(ii) add the logical value of whether it is new or not at the end of a stored list of length X, such that if the number of items in the list is X, adding a new entry drops the oldest entry from the list;
(iii) compute the sum over the list, adding Noo where old follows old, Nnn where new follows new, Non where new follows old, and Nno where old follows new; then divide the resulting sum by X (and call it S);
(iv) compute the difference metric 402 as:

$$1-\exp(S),$$

which is in effect (1–the probability that the last X clusters occur, based on the Markov matrix computed above).
(v) output the difference metric 402.

As stated, the difference metric 402 provides a measure of the likelihood of seeing new messages 104. This can then be compared with what actually happens in practice, i.e. when new messages 104 are actually received as determined by the monitoring process 202. Any significant variation between what is expected and what occurs can be used as an additional indication that new messages 104 are unexpectedly being received, which may indicate for example that the computer resource 103 is under attack and that, in any event, investigation may be required.

Embodiments of the invention have been described with particular reference to the examples illustrated. However, it will be appreciated that variations and modifications may be made to the examples described within the scope of the invention.

The invention claimed is:

1. A system for obtaining a baseline for use in controlling access to a computer resource, the system comprising:
a storage memory; and
one or more processors coupled to the storage memory, wherein the storage memory stores sets of instructions which, when executed, cause the one or more processors to:
assign each computer message of a plurality of computer messages received at a processor to one of a first plurality of clusters according to behavior of said each computer message in the context of a computer resource, wherein computer messages are assigned to a cluster by:
executing instructions for analyzing the computer messages using computer-readable rules to identify a pattern of symbols associated with each computer message, wherein the pattern of symbols associated with said each computer message is identified by executing instructions for:
determining a path through the rules that is taken during analysis of said each computer message that successfully terminates,
grouping said each computer message according to said path, and
determining based on the plurality of computer messages and said grouping each computer message a completeness metric indicating a likelihood that a computer message received in the future will be a new message not yet assigned to a cluster; and
establish a baseline containing a set of computer messages which have been classified based on the completeness metric and according to whether or not each of the computer messages of the set represents acceptable behavior in the context of the computer resource comprising a third plurality of clusters, wherein said each cluster is classified according to whether or not the computer messages assigned to said each cluster represent acceptable behavior in the context of the computer resource.

2. The system according to claim 1, wherein determining the completeness metric comprises determining a measure of probability indicating the probability that the future message will be assigned to a cluster already included in a set of clusters and wherein the measure of probability is obtained taking into account whether each previously received message of a plurality of previously received messages had been assigned to a cluster already included in a set of clusters before the receipt of said each previously received message.

3. The system according to claim 1, wherein:
the specification is codified by defining a first order logic that describes the specification; and
the computer messages are analyzed using the first order logic to obtain patterns associated with the computer messages by executing instructions for:
determining the path that is taken by each computer messages through the first order logic that successfully terminates, and
grouping the computer messages according to said paths.

4. The system according to claim 3, wherein the first order logic has clauses at least some of which are parameterized.

5. The system according to claim 4, wherein at least some of the clauses have a head that is parameterized, the instructions for determining a path being carried out by instructions for determining a path of clauses having a parameterized head through the first order logic that is taken by each computer message that successfully terminates.

6. The system according to claim 4, wherein the first order logic is a stochastic logic program having at least some clauses that are instrumented, the instructions for determining a path being carried out by instructions for determining a path of said instrumented clauses through the first order logic that is taken by each computer message that successfully terminates.

7. The system according to claim 1, wherein a measure of probability comprises a continuous quantitative measure represented by a number between zero and one.

8. The system of claim 1, wherein the storage memory comprises additional instructions which, when executed, cause the one or more processors to:
receive the plurality of computer messages as part of a training process that uses copies of computer message traffic flowing across a network.

9. The system of claim 1, wherein the storage memory comprises additional instructions which, when executed, cause the one or more processors to:
receive, after the baseline is established, a computer message that is not part of the plurality of computer messages;
determine that the computer message cannot be assigned to a cluster; and
in response to determining that the computer message cannot be assigned to a cluster, performing one or more of the following actions: sending a message indicating that the computer message has been received, blocking the computer message, replacing the computer message with another message, creating an audit log of the computer message, or triggering another program or service.

10. The system of claim 1, wherein establishing the baseline comprises:
representing new and old cluster activations as a 2-state Markov chain process;
computing a $1^{st}$ order Markov matrix; and
computing a probability of next seeing an old cluster.

11. The system of claim 10, wherein elements in the $1^{st}$ order Markov matrix predicts whether a next cluster is old or new given that the last n clusters were some permutation of old and new.

12. The system of claim 10, wherein computing the $1^{st}$ order Markov matrix comprises:
maintaining a list of logical constants that indicate, for each message received, whether the received message has been seen before or not;
adding a logical constant to the end of the list of logical constants, wherein the logical constant indicates whether the message has a cluster ID that has been seen before or not; and
computing the $1^{st}$ order Markov matrix by a cross-tabulation of the list of logical constants comparing the first through (last—1) elements with the second through last elements.

13. The system of claim 12, wherein the elements of the $1^{st}$ order Markov matrix comprise:
an element representing a number of times already allocated IDs were used in succession;
an element indicating a number of times a newly allocated ID is followed by an ID that is already allocated;
an element indicating a number of times and already allocated ID is followed by an ID that is already allocated; and
a number of times a new ID is followed by another new ID.

14. The system of claim 1, wherein the storage memory comprises additional instructions which, when executed, cause the one or more processors to:

execute a newness process that classifies a message against an existing cluster identified by a unique ID and whether the new message is new or not;
add a logical value of whether the message is new or not at the end of a stored list of a maximum length X, wherein if the number of items in the stored list is equal to X, adding a new entry drops and oldest entry from the stored list;
computing a sum over the stored list; and
computing a difference metric based on the sum over the stored list.

15. A method of obtaining a baseline for use in controlling access to a computer resource, the method comprising:
assigning each computer message of a plurality of computer messages received at a processor to one of a first plurality of clusters according to behavior of said each computer message in the context of a computer resource, wherein computer messages are assigned to a cluster by:
executing instructions for analyzing the computer messages using computer-readable rules to identify a pattern of symbols associated with each computer message, wherein the pattern of symbols associated with said each computer message is identified by executing instructions for:
determining a path through the rules that is taken during analysis of said each computer message that successfully terminates,
grouping said each computer message according to said path, and
determining based on the plurality of computer messages and said grouping each computer message a completeness metric indicating a likelihood that a computer message received in the future will be a new message not yet assigned to a cluster; and
establishing a baseline containing a set of computer messages which have been classified based on the completeness metric and according to whether or not each of the computer messages of the set represents acceptable behavior in the context of the computer resource comprising a third plurality of clusters, wherein said each cluster is classified according to whether or not the computer messages assigned to said each cluster represent acceptable behavior in the context of the computer resource.

16. The method according to claim 15,
wherein determining the completeness metric comprises determining a measure of probability indicating the probability that the future message will be assigned to a cluster already included in a set of clusters and
wherein the-measure of probability is obtained taking into account whether each previously received message of a plurality of previously received messages had been assigned to a cluster already included in a set of clusters before the receipt of said each previously received message.

17. The method according to claim 15, wherein:
the specification is codified by defining a first order logic that describes the specification; and
the computer messages are analyzed using the first order logic to obtain patterns associated with the computer messages by executing instructions for:
determining the path that is taken by each computer messages through the first order logic that successfully terminates, and
grouping the computer messages according to said paths.

18. The method according to claim 17, wherein the first order logic has clauses at least some of which are parameterized.

19. The method according to claim 18, wherein at least some of the clauses have a head that is parameterized, the instructions for determining a path being carried out by instructions for determining a path of clauses having a parameterized head through the first order logic that is taken by each computer message that successfully terminates.

20. The method according to claim 18, wherein the first order logic is a stochastic logic program having at least some clauses that are instrumented, the instructions for determining a path being carried out by instructions for determining a path of said instrumented clauses through the first order logic that is taken by each computer message that successfully terminates.

21. The method according to claim 15, wherein a measure of probability comprises a continuous quantitative measure represented by a number between zero and one.

22. A non-transitory computer-readable medium for obtaining a baseline for use in controlling access to a computer resource, having sets of instructions stored thereon which, when executed by a computer, cause the computer to:
assign each computer message of a plurality of computer messages received at a processor to one of a first plurality of clusters according to behavior of said each computer message in the context of a computer resource, wherein computer messages are assigned to a cluster by:
executing instructions for analyzing the computer messages using computer-readable rules to identify a pattern of symbols associated with each computer message, wherein the pattern of symbols associated with said each computer message is identified by executing instructions for:
determining a path through the rules that is taken during analysis of said each computer message that successfully terminates,
grouping said each computer message according to said path, and
determining based on the plurality of computer messages and said grouping each computer message a completeness metric indicating a likelihood that a computer message received in the future will be a new message not yet assigned to a cluster; and
establish a baseline containing a set of computer messages which have been classified based on the completeness metric and according to whether or not each of the computer messages of the set represents acceptable behavior in the context of the computer resource comprising a third plurality of clusters, wherein said each cluster is classified according to whether or not the computer messages assigned to said each cluster represent acceptable behavior in the context of the computer resource.

23. The non-transitory computer-readable medium according to claim 15,
wherein determining the completeness metric comprises determining a measure of probability indicating the probability that the future message will be assigned to a cluster already included in a set of clusters and
wherein the-measure of probability is obtained taking into account whether each previously received message of a plurality of previously received messages had been assigned to a cluster already included in a set of clusters before the receipt of said each previously received message.

24. The non-transitory computer-readable medium according to claim 22, wherein:
the specification is codified by defining a first order logic that describes the specification; and
the computer messages are analyzed using the first order logic to obtain patterns associated with the computer messages by executing instructions for:
determining the path that is taken by each computer messages through the first order logic that successfully terminates, and
grouping the computer messages according to said paths.

25. The non-transitory computer-readable medium according to claim 24, wherein the first order logic has clauses at least some of which are parameterized.

26. The non-transitory computer-readable medium according to claim 25, wherein at least some of the clauses have a head that is parameterized, the instructions for determining a path being carried out by instructions for determining a path of clauses having a parameterized head through the first order logic that is taken by each computer message that successfully terminates.

27. The non-transitory computer-readable medium according to claim 25, wherein the first order logic is a stochastic logic program having at least some clauses that are instrumented, the instructions for determining a path being carried out by instructions for determining a path of said instrumented clauses through the first order logic that is taken by each computer message that successfully terminates.

28. The non-transitory computer-readable medium according to claim 22, wherein a measure of probability comprises a continuous quantitative measure represented by a number between zero and one.

* * * * *